W. J. RIGNEY.
APPARATUS FOR GAMES.
APPLICATION FILED APR. 3, 1908.
942,103.
Patented Dec. 7, 1909.
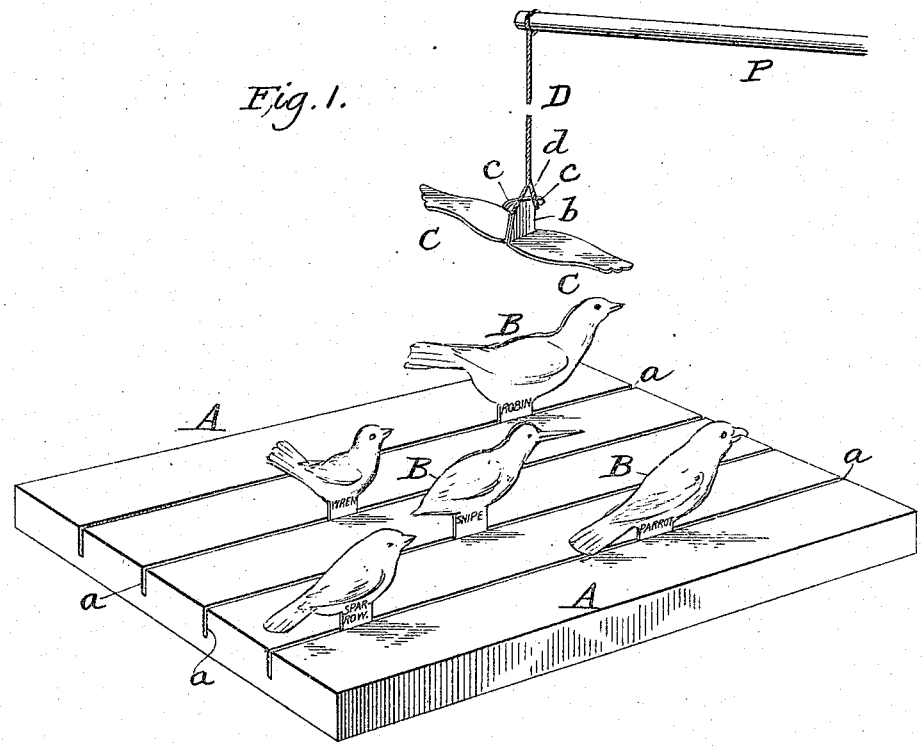
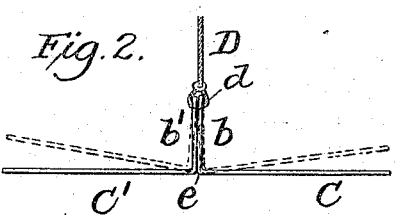
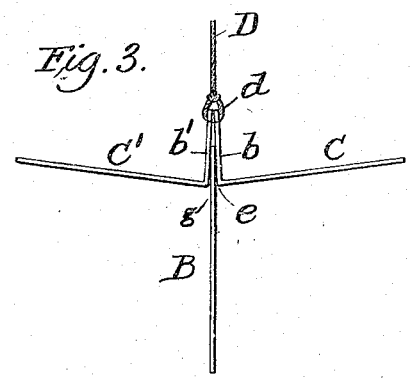
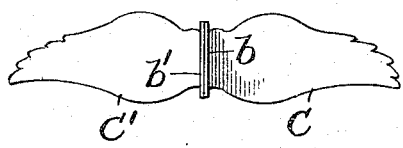
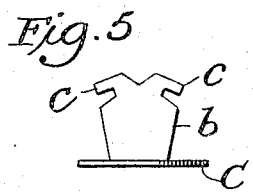
WITNESSES:
James F. Duhamel
John Rak Jr.
INVENTOR
William J. Rigney
BY
A. Reed Malcomson
ATTORNEY

UNITED STATES PATENT OFFICE.

WILLIAM J. RIGNEY, OF BROOKLYN, NEW YORK, ASSIGNOR TO McLOUGHLIN BROTHERS, OF BROOKLYN, NEW YORK, A FIRM.

APPARATUS FOR GAMES.

942,103. Specification of Letters Patent. Patented Dec. 7, 1909.

Application filed April 3, 1908. Serial No. 425,078.

*To all whom it may concern:*

Be it known that I, WILLIAM J. RIGNEY, a citizen of the United States, residing in the borough of Brooklyn, county of Kings, State of New York, have invented certain new and useful Apparatus for Games, of which the following is a specification.

This invention relates to game apparatus designed for the amusement and instruction of the players.

It comprises novel apparatus by means of which pieces of card board or other suitable material, cut or formed to represent different birds, are caught and removed by the players from a platform provided with slots, in which the birds are supported. The removal of the birds is accomplished by the use of a pair of angle pieces, made to represent wings, which are adapted to slip over the backs of the birds.

The style of the apparatus and its manner of operation will be more particularly set forth and shown in the following specification and drawings.

Figure 1 represents the game board with birds in position in the slots showing the removing wings suspended above them. Fig. 2 is a separate end view of the removing wings. Fig. 3 is another end view of the removing wings in the position of adjustment over the back of a bird. Fig. 4 is a separate top view of the removing wings. Fig. 5 is a separate side view of one of the wings.

A represents a platform preferably made of wood in which are formed slots $a$.

B are the game pieces which represent birds. By preference each bird is shaped and painted to represent a certain member of the feathered species. The lower portion of each bird is formed to slide into the slots $a$ and is thus held in an upright position, as shown in Fig. 1, ready to be removed by the players as hereinafter set forth. The number and different kinds of birds used for the game pieces is determined by the person constructing the game. The players may use any number of birds that can be conveniently placed in the slots which will depend on the size of the platform and number of slots. The middle of the back of each bird is formed with a comparatively thin portion having its outer surface or sides parallel in order to receive the wings and act in conjunction with them in removing the birds from the platform as shown in Fig. 3. The birds may be formed in any desired manner. I preferably stamp or press them up out of card-board, paper, or other suitable material. The lower or foot portion of the birds should be of the proper size or thickness to fit loosely in the slots $a, a$ and of sufficient depth to rest loosely therein in an upright position, so as to be readily removed. The size of the birds is not material, except that they should be reasonably light to aid in their successful removal from the game board.

C, C' are two pieces of material representing the wings of a bird which are preferably stamped up of tin or thin metal. At the inner end of each wing, and integral therewith are portions $b$, $b'$, turned up at right angles, so as to form hangers for the wings. When in a vertical position the opposing sides of the hangers tend to lie closely and press against each other when held together at their upper ends. The weight of the wings while in a horizontal position also presses the hangers against each other at the bottom when hinged or otherwise loosely held together at the top. I preferably hinge the two wings together by means of the hanger pieces and a flexible element such as a loop of cord, for the purpose of grasping the birds at the top of the backs which will cause their removal from the game board when the wings are raised by lifting, or pulling on the attaching cord.

To assist in connecting the hanger pieces $b$, $b'$ to each other, they are preferably notched on the upper portion and extended at both sides so as to form projections $c\ c$, as shown in Fig. 5. Slipped over and about these projections is a combining loop $d$, of cord or other flexible material, which binds the hangers together allowing them to spread at the bottom when the loop is slack. The loop $d$ is suspended at the end of a cord D which is preferably attached at its other end to a pole P which is held in the hand, (not shown) when the game is being played and the birds are being withdrawn from the platform by the player. The two wings C and C' are by this means loosely hinged or combined together and will operate in the manner hereafter described. The angle or corner where the hangers $b\ b'$ are turned up from the wings is slightly rounded as shown at *e* which affords an entering space and facilitates the sliding of the wings over the thin part or gripping space *g* on the backs of the birds, when they are loosely dropped thereon by the player.

In practice, the game pieces B being in position in the slots, by the use of the line and loop the wings are gently dropped astride of the thin gripping space *g*, on the back of the bird when the outer end of each wing will tend to rise so the gripping space enters between the hangers and pushes them apart. By careful manipulation of the loop and wings by the player the hangers are caused to separate and slip down, one on each side of the gripping space. The line is then pulled taut by the player by raising the fishing pole and the outer parts of the wings by reason of their weight and horizontal position will press the hangers together and cause them to pinch on the intervening part of the birds so as to cause sufficient friction to lift them from the slot when the cord is pulled up.

Preferably I print on each bird its name. Each game piece may also be numbered and the number placed on the lower portion so it will be hidden by the slot until removed by the player.

What I claim as my invention and desire to secure by Letters Patent is:

1. In a game apparatus a pair of wings adapted to engage with a flat portion of a body imitating a bird each wing comprising a laterally projecting portion and an inner or body portion turned up at right angles thereto, said body portions being adapted to lie against each other when in a vertical position and such turned up portions being hingedly connected together at their upper ends by suitable means, substantially as and for the purpose shown and described.

2. In a game apparatus a pair of wings adapted to engage with a flat portion of a body imitating a bird each wing being composed of a laterally projecting flat portion and an upright portion at right angles thereto, the upright portions having projections at their upper ends for engaging a connecting element, and a connecting loop of flexible material in engagement with the upright portions by the medium of said projections, substantially as and for the purposes shown and described.

WILLIAM J. RIGNEY.

Witnesses:
A. BELL MALCOMSON,
JOHN RAK, Jr.